United States Patent [19]

Meany

[11] 4,095,716
[45] Jun. 20, 1978

[54] COMBINED SPOON AND VESSEL

[76] Inventor: William T. Meany, 477 Park Pl., Brooklyn, N.Y. 11238

[21] Appl. No.: 791,794

[22] Filed: Apr. 28, 1977

[51] Int. Cl.² ............................................. B65D 23/12
[52] U.S. Cl. .......................... 215/100 R; 215/DIG. 5
[58] Field of Search ...................... 215/100 R, DIG. 5; 211/69.2; 81/3.1; 222/567, 570

[56] References Cited

U.S. PATENT DOCUMENTS

| 784,830 | 3/1905 | Beistle | 215/100 R |
| 2,134,090 | 9/1944 | Scheemaeker | 215/DIG. 5 |
| 3,249,250 | 5/1966 | McKee | 215/100 R |

FOREIGN PATENT DOCUMENTS

| 606,457 | 1/1946 | United Kingdom | 215/DIG. 5 |

Primary Examiner—Ro E. Hart

[57] ABSTRACT

A combination spoon and vessel in which the same fits by conforming to the interior shape thereof, the spoon additionally is engaged by a slot in the vessel; the latter may have a cover to confine the contents thereof and the spoon at the same time.

8 Claims, 3 Drawing Figures

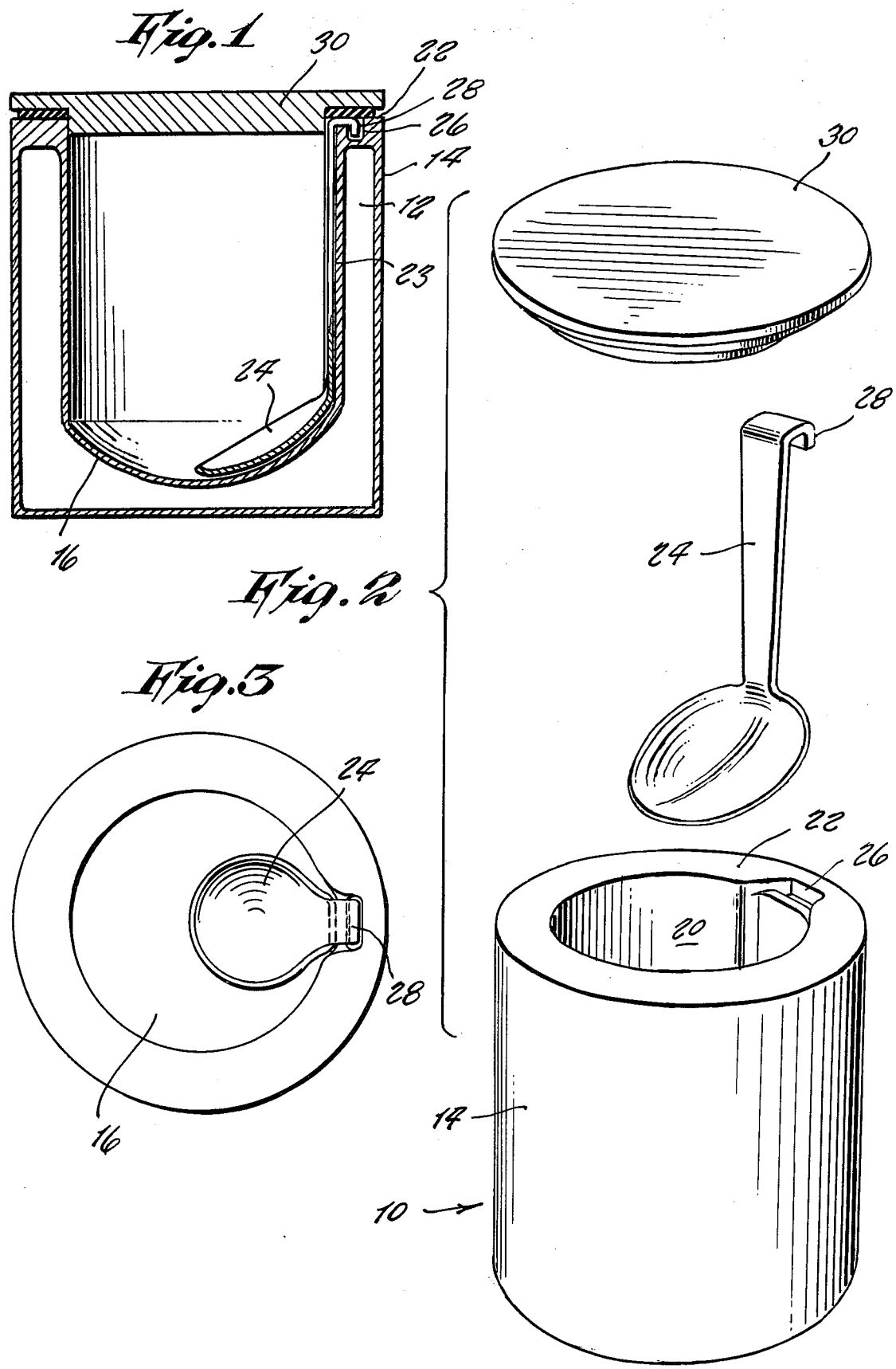

COMBINED SPOON AND VESSEL

BACKGROUND OF THE INVENTION

This invention relates to a combination spoon and vessel; more particularly to a spoon that is stored within the vessel when the former is not being used.

The prior art teaches a variety of combination spoon and vessel, for example, as disclosed in U.S. Pat. Nos. 1,240,072; 1,549,269; 1,607,865; 1,834,085; 2,175,735; 2,483,586; 2,485,303; 2,738,900; and others.

SUMMARY OF THE INVENTION

It is accordingly an object of the instant invention to provide for a new and improved combination spoon and vessel housing the same.

It is another object to provide for one wherein the spoon depends into the vessel and is engaged thereby for storing the same when not in use.

It is a further object to provide for the same at relatively little cost thereby making it generally available.

These and other objects and advantages of the invention will become more apparent from a consideration of the following detailed disclosure and claims and by reference to the accompanying drawing, in which:

FIG. 1 is a sectional view;
FIG. 2 is an exploded view; and
FIG. 3 is a top plan.

Browdly speaking, the instant invention includes the provision of a tool and container, the container being formed of a hollow walled body having an interior surface and exterior surface, a base and an open mouth defined by a rim, the rim defining a recess, the interior surface having a predetermined contour, the tool having a length not greater than the depth of the container, at least one surface of the tool having a contour corresponding to that of the interior surface, the tool having a hooked portion at one distal end, the hooked portion engaging the recess whereby the tool depends from the rim into said container in longitudinal alignment therewith.

DETAILED DISCLOSURE

Referring more particularly to the drawings, there is shown a walled hollow vessel or container 10 that may have any particular shape, though in the present drawings the same is annular and is of the thermos or vacuum jar type wherein there is a space or cavity 12 between the outer wall 14 and an inner wall 16; the foregoing construction is not, however, mandatory to the attainment of the instant invention. The container 10 will have a base 18 and an open mouth 20 defined by a rim 22, the former communicating with the hollow interior of the container. The interior wall 16 will have a predetermined shape that will correspond to the shape defined on one surface 23 of a tool or utensil 24 (i.e. spoon) that will be thereagainst when the latter is placed in the container 10. For example, a tool 24 having a straight planar side and a curved work end that matches the interior wall 16 of the container 10 in both length and coutour. Alternatively, a portion of the interior wall 16 may 16 may define a recess (not shown) which cirresponds to the length and contour of the tool 24 such that the same is engaged therein and fits into the same out of the area defined by the hollow container 10.

In either embodiment, a slit or recess 26 will be defined in the rim 22 (it may be annular) to engage a hooked end 28 of the tool 24 thereby supporting the same in the container 10. In the preferred embodiment, a portion of the interior wall 16 is also cut away such that there is formed a shoulder between the interior wall 16 and the exterior wall 10 with the recess 26 therebetween.

If desired, a cover 30 may be provided to seal the container 10. The former may be externally threaded to engage cooperating internal threads on the wall 16 or snap fit, etc.

Since it is obvious that numerous changes and modifications can be made in the above-described details wtihout department from the spirit and nature of the invention, it is to be understood that all such changes and modifications are included within the scope of the invention.

I claim:

1. In combination, a tool and container, said container being formed of a hollow walled body having an interior surface and exterior surface, a base and an open mouth defined by a rim, said rim defining a recess said interior surface having a predetermined contour, said tool having a length not greater than the depth of said container, at least one surface of said tool having a contour corresponding to that of said interior surface, said tool having a hooked portion at one distal end, said hooked portion engaging said recess whereby said tool depends from said rim into said container in longitudinal alignment therewith.

2. The combination as defined in claim 1, where said container defines a closed cavity between said exterior and interior surfaces.

3. The combination as defined in claim 1, wherein at least a portion of said interior surface defines a second recess correpsonding in length, depth and contour to said tool whereby said tool is recessed out of the plane of said interior surface.

4. The combination as defined in claim 1, wherein said first recess is disposed about said entire rim.

5. The combination as defined in claim 1, wherein said interior surface is of non uniform depth, being shortest adjacent said first recess.

6. The combination as defined in claim 1, wherein said tool is an eating utensil.

7. The combination as defined in claim 1, and a cover aperature to close said open mouth.

8. The combination as defined in claim 7, wherein said cover is externally threaded and at least a portion of said interior surface is cooperatively threaded adjacent said rim.

* * * * *